(12) United States Patent
Kim et al.

(10) Patent No.: US 11,443,150 B2
(45) Date of Patent: Sep. 13, 2022

(54) AUTOMOTIVE SENSOR INTEGRATION MODULE

(71) Applicant: HYUNDAI MOBIS CO., LTD., Seoul (KR)

(72) Inventors: Young Shin Kim, Yongin-si (KR); Won Gyum Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 341 days.

(21) Appl. No.: 16/726,703

(22) Filed: Dec. 24, 2019

(65) Prior Publication Data

US 2021/0125008 A1  Apr. 29, 2021

(30) Foreign Application Priority Data

Oct. 24, 2019  (KR) .................. 10-2019-0133129

(51) Int. Cl.
| | |
|---|---|
| G06K 9/62 | (2022.01) |
| G01S 13/86 | (2006.01) |
| G05B 23/02 | (2006.01) |
| G06V 10/98 | (2022.01) |
| G06V 20/58 | (2022.01) |
| G06V 20/56 | (2022.01) |
| G01S 13/931 | (2020.01) |
| B60W 50/02 | (2012.01) |

(52) U.S. Cl.
CPC ............ G06K 9/6288 (2013.01); G01S 13/86 (2013.01); G05B 23/0205 (2013.01); G06K 9/6217 (2013.01); G06V 10/98 (2022.01); G06V 20/58 (2022.01); G06V 20/588 (2022.01); *B60W 2050/0215* (2013.01); *G01S 13/865* (2013.01); *G01S 13/867* (2013.01); *G01S 13/931* (2013.01)

(58) Field of Classification Search
CPC .......................... G01S 13/865; G01S 13/867
See application file for complete search history.

(56) References Cited

U.S. PATENT DOCUMENTS

| | | | |
|---|---|---|---|
| 2018/0143298 A1* | 5/2018 | Newman ................ | G08G 1/165 |
| 2018/0204435 A1* | 7/2018 | Hilsinger ............... | G01N 21/53 |
| 2019/0016316 A1* | 1/2019 | Sung ..................... | G01S 13/931 |

* cited by examiner

*Primary Examiner* — Nabil H Syed
*Assistant Examiner* — Cal J Eustaquio
(74) *Attorney, Agent, or Firm* — H.C. Park & Associates, PLC

(57) ABSTRACT

An automotive sensor integration module including a plurality of sensors which differ in at least one of a sensing period or an output data format, and a signal processing unit, which simultaneously outputs, as sensing data, pieces of detection data respectively output from the plurality of sensors on the basis of the sensing period of any one of the plurality of sensors, determines whether each region of an outer cover corresponding to a location of each of the plurality of sensors is contaminated on the basis of the pieces of detection data, and outputs a determination result as contamination data.

11 Claims, 8 Drawing Sheets

AUTOMOTIVE SENSOR INTEGRATION MODULE

CROSS-REFERENCE TO RELATED APPLICATION

This application claims priority from and the benefit of Korean Patent Application No. 10-2019-0133129, filed on Oct. 24, 2019, which is hereby incorporated by reference for all purposes as if set forth herein.

BACKGROUND

Field

Exemplary embodiments relate to an automotive sensor integration module.

Discussion of the Background

As technology becomes more advanced, various sensors, electronic devices, and the like are also provided in a vehicle for user convenience. In particular, research regarding an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions respectively.

Although objects should be identified on the basis of detection results detected by sensors at the same timing in order to improve performance in detecting objects, it is not easy to synchronize object detection sensors because the sensors are disposed at different positions. Furthermore, when there is dirt or other foreign matter on outer cover surfaces of the sensors, it is difficult for each of the sensors to output a detection result for normal object discrimination.

The above information disclosed in this Background section is only for enhancement of understanding of the background of the invention and, therefore, it may contain information that does not constitute prior art.

SUMMARY

Exemplary embodiments of the present invention provide an automotive sensor integration module in which a plurality of synchronized sensors are arranged.

The inventive concepts are not limited to the above-mentioned exemplary embodiments, and other aspects and advantages of the present invention, which are not mentioned, will be understood through the following description, and will become apparent from the embodiments of the present invention. Furthermore, it will be understood that aspects and advantages of the present invention can be achieved by the means set forth in the claims and combinations thereof.

An exemplary embodiment of the present invention provides an automotive sensor integration module including a plurality of sensors which differ in at least one of a sensing period or an output data format, and a signal processing unit, which simultaneously outputs, as sensing data, pieces of detection data respectively output from the plurality of sensors on the basis of the sensing period of any one of the plurality of sensors, determines whether each region of an outer cover corresponding to a location of each of the plurality of sensors is contaminated on the basis of the pieces of detection data, and outputs a determination result as contamination data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
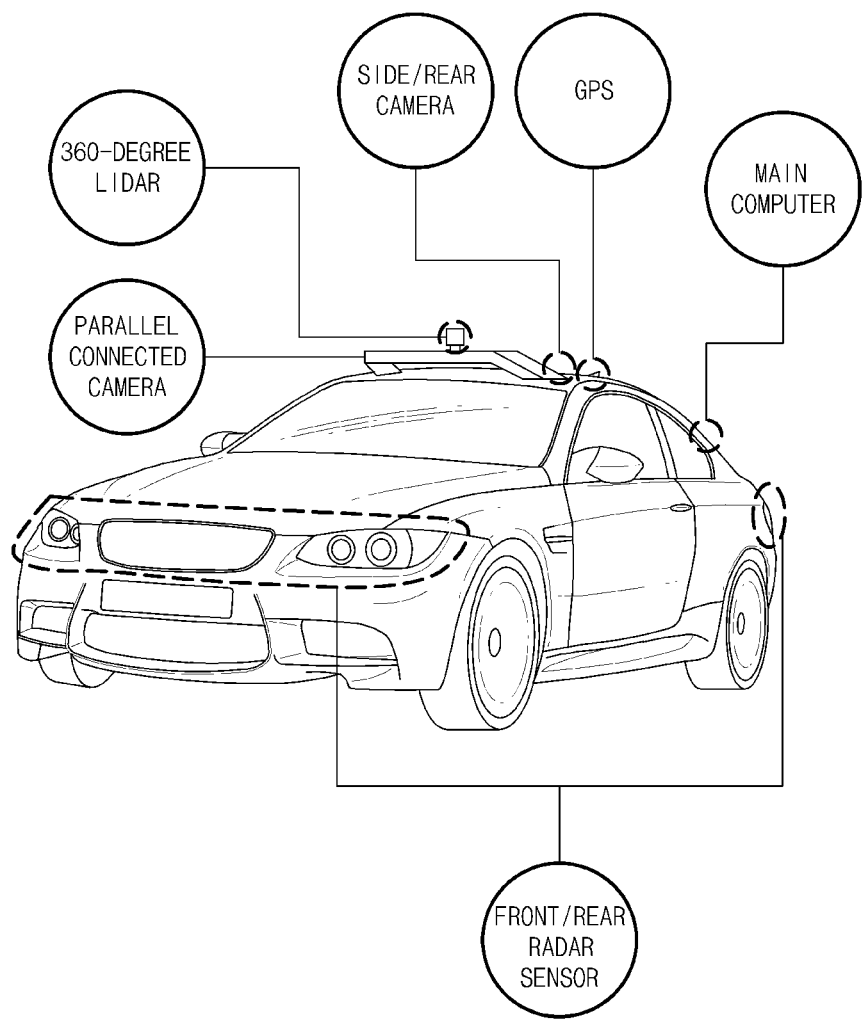
FIG. 1 is a diagram illustrating an outer shape of an autonomous vehicle.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, exemplary embodiments of the present invention will be described in more detail with reference to the accompanying drawings.

Figure 2:
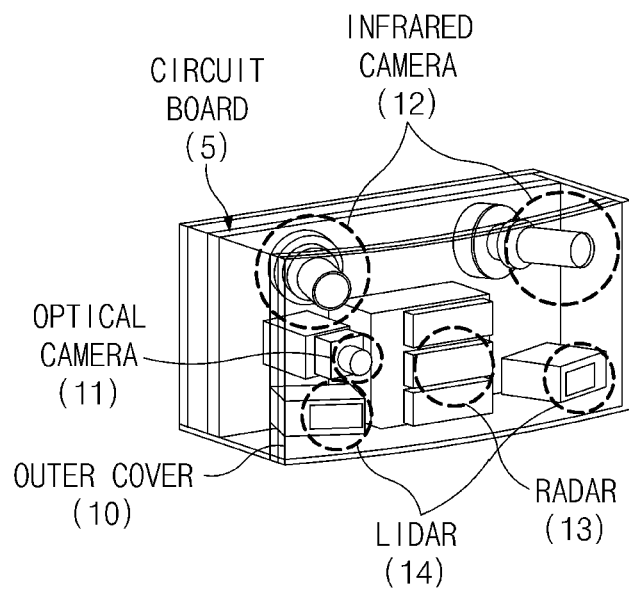
FIG. 2 is an outside view of an automotive sensor integration module according to an exemplary embodiment of the present invention.

FIG. 2 is an outside view of an automotive sensor integration module according to an exemplary embodiment of the present invention.

An automotive sensor integration module according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane in which a vehicle is driving in the opposite direction. The lane may include left and right lines forming a lane.

Another vehicle may be a vehicle that is travelling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels.

The two-wheeled vehicle may be a vehicle that has two wheels and is located within a predetermined distance from the host vehicle. For example, the two-wheeled vehicle may include a motorcycle or a bicycle on a sidewalk, or the roadway within a predetermined distance from the vehicle.

The traffic signal may include a traffic light, a traffic sign, or a pattern or text drawn on a road surface.

The light may include light from a lamp in another vehicle, light from a street lamp, or light emitted from the sun.

The road may include a road surface, a curve, and a slope, such as an upward slope and a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified into a moving object and a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module 100 according to an exemplary embodiment of the present invention may include a plurality of different types of sensors and devices. In addition, the automotive sensor integration module 100 according to an exemplary embodiment of the present invention may include at least one sensor and device of the same type.

Referring to FIG. 2, the automotive sensor integration module 100 according to an exemplary embodiment of the present invention may include an infrared camera 12, an optical camera 11, a lidar 14, and a radar 13 as a sensor to identify an object outside a vehicle. The automotive sensor integration module 100 according to an exemplary embodiment of the present invention illustrated in FIG. 2 is exemplarily shown to include an infrared camera 12, an optical camera 11, a lidar 14, and a radar 13 as a sensor in order to identify an object, but is not limited thereto. In addition, the automotive sensor integration module 100 according to an exemplary embodiment of the present invention illustrated in FIG. 2 shows two infrared cameras 12, one optical camera 11, two lidars 14, and one radar 13, but the number of each sensor is suggested only for illustrative purposes and is not limited thereto.

Referring to FIG. 2, the automotive sensor integration module 100 according to an exemplary embodiment of the present invention may include a circuit board 5, an infrared camera 12, an optical camera 11, a radar 13, and a lidar 14. For example, the automotive sensor integration module 100 according to an exemplary embodiment of the present invention may include a circuit board 5 on which an infrared camera 12, an optical camera 11, a radar 13, and a lidar 14 are disposed and mounted.

The optical camera 11 designed to acquire outside images of a vehicle through light and recognize objects, light, and people around the vehicle may include a mono camera, a stereo camera, an around view monitoring (AVM) camera, and a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time-of-flight (TOF) method or a phase-shift method through electromagnetic waves, and detect the location of a detected object, the distance to the detected object, and the relative speed. The radar 13 has an advantage of being capable of long distance detection without being affected by environmental factors, such as darkness, snow, rain, fog, etc., but has a disadvantage of failing to detect an object, made of an electromagnetic wave-absorbing material, for example, a steel structure, such as a tunnel or a guardrail, and thus, being unable to classify objects.

The lidar 14 may detect an object on the basis of a TOF method or a phase-shift method through laser light, and detect the location of a detected object, the distance to the detected object, and the relative speed. The lidar 14 has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through infrared rays. In particular, the infrared camera 12 may acquire outside images of the vehicle even in darkness at night. The infrared camera 12 has advantages of being capable of long distance detection and being capable of distinguishing living things from objects without being affected by environmental factors such as darkness, snow, rain, fog, etc. but has a disadvantage of being expensive.

The automotive sensor integration module 100 according to an exemplary embodiment of the present invention is configured such that an outer cover 10 is coupled in the direction of the detection area of an optical camera 11, an infrared camera 12, a radar 13, and a lidar 14, that is, to the front surface of the automotive sensor integration module 100 to thereby protect the optical camera 11, the infrared camera 12, the radar 13, and the lidar 14 from physical shocks.

As such, in order to accurately classify and identify external objects around a vehicle regardless of environmental factors, the advantages and disadvantages of each sensor must be combined. Therefore, the automotive sensor integration module 100 according to an exemplary embodiment of the present invention discloses a structure in which a plurality of different sensors are all disposed and mounted on a circuit board 5. In addition, the automotive sensor integration module 100 according to an exemplary embodiment of the present invention may synchronize and output detection results of a plurality of sensors having different operation cycles, thereby having an advantage of classifying and identifying objects more accurately.

Figure 3:
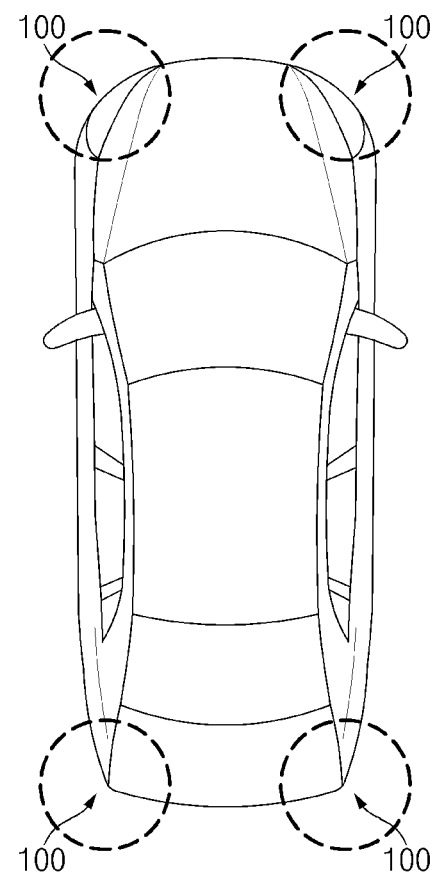
FIG. 3 is a diagram illustrating a vehicle in which automotive sensor integration modules according to an exemplary embodiment of the present invention are arranged.

FIG. 3 is a diagram illustrating a vehicle in which automotive sensor integration modules 100 according to an exemplary embodiment of the present invention are arranged.

Referring to FIG. 3, a plurality of automotive sensor integration modules 100 according to an exemplary embodiment of the present invention may be arranged in a vehicle to detect objects outside the vehicle.

FIG. 3 exemplarily illustrates that four automotive sensor integration modules 100 are arranged in a vehicle, but the inventive concepts are not limited thereto. Furthermore, FIG. 3 exemplarily illustrates that automotive sensor integration modules 100 are arranged at right and left front sides of a vehicle to detect right and left objects in front of the vehicle, and automotive sensor integration modules 100 are arranged at right and left rear sides of the vehicle to detect right and left objects in back of the vehicle.

Figure 4:
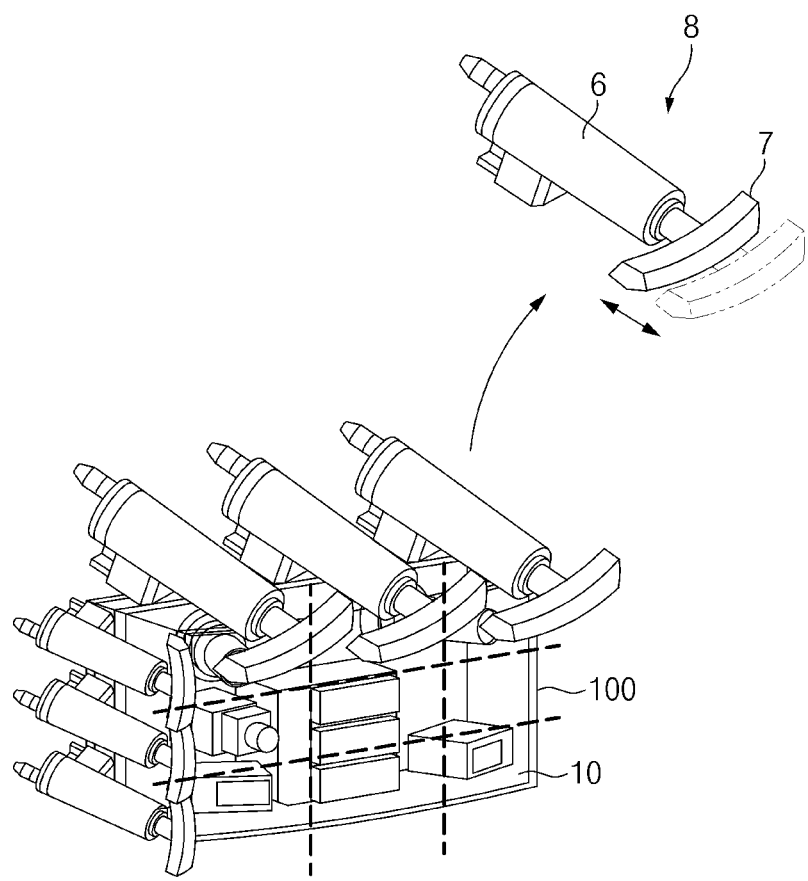
FIG. 4 is a diagram illustrating an automotive sensor integration module according to an exemplary embodiment of the present invention and a cleaning device for cleaning an outer surface of the automotive sensor integration module.

FIG. 4 is a diagram illustrating an automotive sensor integration module 100 according to an exemplary embodiment of the present invention and a cleaning device for cleaning an outer surface of the automotive sensor integration module 100.

The automotive sensor integration module 100 according to an exemplary embodiment of the present invention is arranged outside a vehicle to detect objects outside the vehicle as illustrated in FIG. 3, and thus, it may be difficult to detect objects normally due to adherence of dirt or other foreign matter such as dust, bird droppings, and the like.

Therefore, the automotive sensor integration module 100 according to the present invention may be combined with a cleaning device 8, as illustrated in FIG. 4. A plurality of cleaning devices 8 may be combined with the automotive sensor integration module 100 so that each of the cleaning devices 8 may clean a corresponding region of a portion of an outer cover 10 of the automotive sensor integration module 100. Here, the cleaning device 8 may spray a liquid (for example, water) on the corresponding region to clean the corresponding region, and the cleaning device 8 may include a body 6 and a sprayer 7 including a liquid spray nozzle. Since the sprayer 7 may be moved towards or away from the body 6, a liquid spray position may be varied according to a position of the sprayer 7.

FIG. 4 illustrates an example in which the outer cover 10 of the automotive sensor integration module 100 according to the present invention is divided into nine regions so that six cleaning devices 8 may clean each of the divided regions of the outer cover 10, but the inventive concepts are not limited to the example of FIG. 4.

Since the automotive sensor integration module 100 according to the present invention includes a plurality of sensors, the cleaning devices 8 combined with the automotive sensor integration module 100 may be configured to clean outer cover regions corresponding to locations in which the sensors are arranged.

Therefore, the automotive sensor integration module 100 according to the present invention may provide a cleaning control device with contamination data about the outer cover regions 8 corresponding to the locations in which the sensors are arranged so that the cleaning devices 8 may clean only some stained outer cover regions among all of the outer cover regions of the automotive sensor integration module 100.

Figure 5:
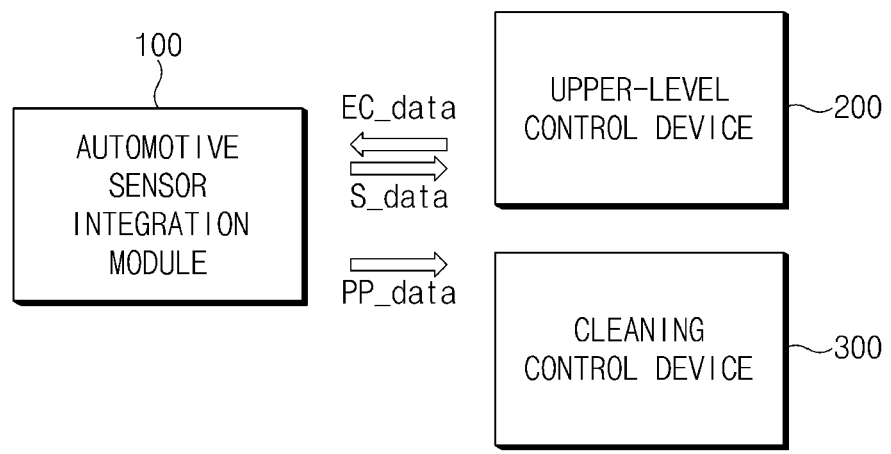
FIG. 5 is a diagram illustrating a configuration of a vehicle in which an automotive sensor integration module according to an exemplary embodiment of the present invention is arranged.

FIG. 5 is a diagram illustrating a configuration of a vehicle in which an automotive sensor integration module 100 according to an exemplary embodiment of the present invention is arranged.

The vehicle in which an automotive sensor integration module 100 according to an exemplary embodiment of the present invention is arranged may further include an upper-level control device 200 and a cleaning control device 300.

Referring to FIG. 5, the vehicle may include the automotive sensor integration module 100, the upper-level control device 200, and the cleaning control device 300.

The automotive sensor integration module 100 may synchronize pieces of detection data obtained from each sensor, and may provide synchronized data as sensing data S_data to the upper-level control device 200. The automotive sensor integration module 100 may generate contamination data PP_data on the basis of the detection data obtained from each sensor, and may provide the generated contamination data PP_data to the cleaning control device 300.

The upper-level control device 200 may provide external environment data EC_data to the automotive sensor integration module 100. The external environment data EC_data may include at least one of weather, road condition, temperature, or humidity.

Although the automotive sensor integration module 100 according to an exemplary embodiment of the present invention is described as being provided with the external environment data EC_data from the upper-level control device 200, the automotive sensor integration module 100 may be provided with the external environment data EC_data from a temperature sensor, a humidity sensor, a rain sensor, and a navigation device arranged in a vehicle.

The upper-level control device 200 may be a separate device for controlling the automotive sensor integration module 100, or a device included in an automated driving system or advanced driver assistance system (ADAS) to identify objects or control driving of a vehicle.

The cleaning control device 300 may control operation of the plurality of cleaning devices 10 illustrated in FIG. 4 on the basis of the contamination data PP_data provided from the automotive sensor integration module 100. Here, the contamination data PP_data may include information indicating whether each of outer cover regions respectively corresponding to the locations of the plurality of sensors included in the automotive sensor integration module 100 is contaminated.

Here, the automotive sensor integration module 100, the upper-level control device 200, and the cleaning control device 300 may be connected by vehicle network communication. A vehicle network communication technology may include controller area network (CAN) communication, local interconnect network (LIN) communication, Flex-Ray® communication, Ethernet, and the like.

Figure 6:
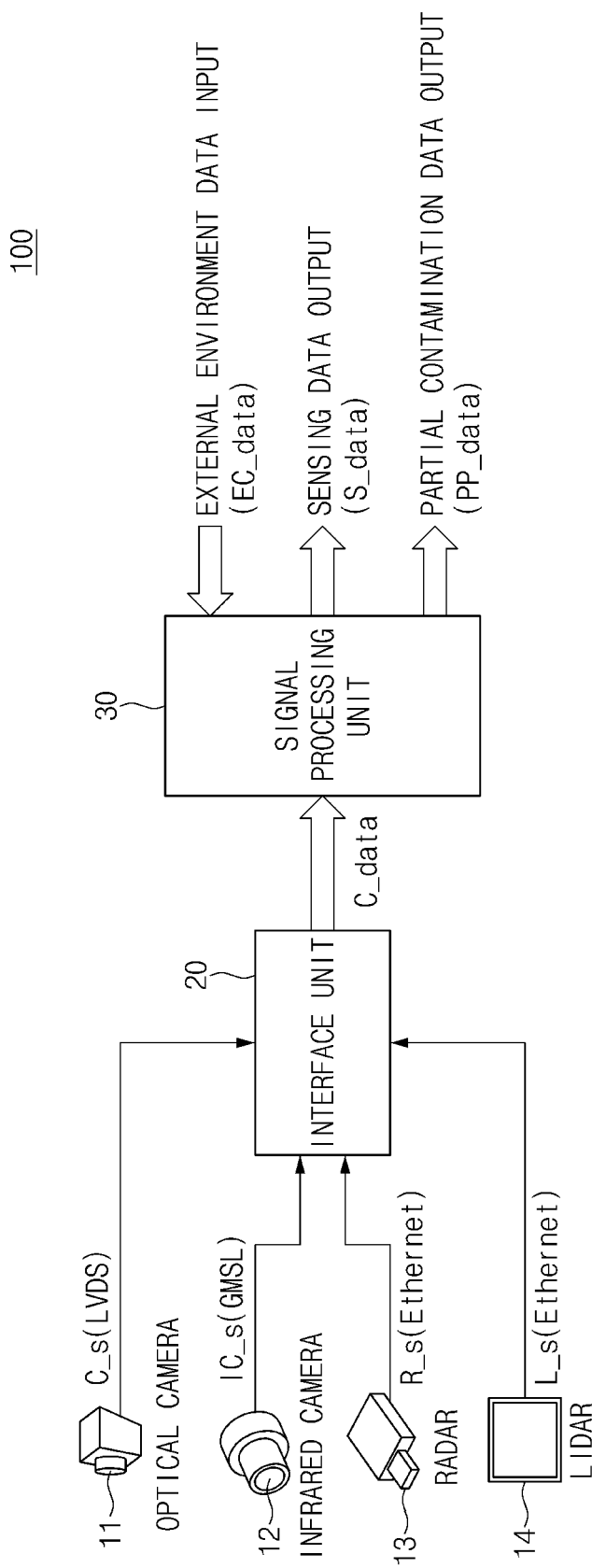
FIG. 6 is a diagram illustrating a configuration of an automotive sensor integration module according to an exemplary embodiment of the present invention.

FIG. 6 is a diagram illustrating a configuration of an automotive sensor integration module 100 according to an exemplary embodiment of the present invention.

Referring to FIG. 6, the automotive sensor integration module 100 according to an embodiment of the present invention may include an optical camera 11, an infrared camera 12, a radar 13, a lidar 14, an interface unit 20, and a signal processing unit 30. Here, the interface unit 20 and the signal processing unit 30 may be implemented as hardware or software in the circuit board illustrated in FIG. 2.

The optical camera 11 may output information detected by medium of light as first detection data C_s.

The infrared camera 12 may output information detected by medium of infrared light as second detection data IC_s.

The radar 13 may output information detected by medium of electromagnetic waves as third detection data R_s.

The lidar 14 may output information detected by medium of laser light as fourth detection data L_s.

Here, the optical camera 11, the infrared camera 12, the radar 13, and the lidar 14 may have different sensing (operation) periods. For example, the optical camera 11 and the infrared camera 12 may have a sensing period of 30 Hz, the radar 13 may have a sensing period of 20 Hz, and the lidar 14 may have a sensing period of 10 Hz.

Therefore, the optical camera 11 and the infrared camera 12 may output the first and second detection data C_s and IC_s every first time (33 ms), the radar 13 may output the third detection data R_s every second time (50 ms), and the lidar 14 may output the fourth detection data L_s every third time (100 ms).

Furthermore, the detection data C_s, IC_s, R_s, and L_s respectively output from the optical camera 11, the infrared camera 12, the radar 13, and the lidar 14 may have different communication standards. For example, the first detection data C_s output from the optical camera 11 may have a format used in low voltage differential signal (LVDS) communication.

The second detection data IC_s output from the infrared camera 12 may have a format used in gigabit multimedia serial link (GMSL) communication. The third and fourth detection data R_s and L_s output from the radar 13 and the lidar 14, respectively, may have a format used in Ethernet communication.

The interface unit 20 may convert the first-to-fourth detection data C_s, IC_s, R_s, and L_s having different data formats into one preset data format to provide converted data as conversion data C_data to the signal processing unit 30.

The interface unit 20 may convert the formats of the first-to-fourth detection data C_s, IC_s, R_s, and L_s into a data format according to a preset communication technology among vehicle network communication technologies. Here, the vehicle network communication technologies may include controller area network (CAN) communication, local interconnect network (LIN) communication, Flex-Ray® communication, Ethernet, and the like. For example, the interface unit 20 may convert the first-to-fourth detection data C_s, IC_s, R_s, and L_s into data having a format according to Ethernet communication.

The signal processing unit 30 may receive, as the conversion data C_data, the first-to-fourth detection data C_s, IC_s, R_s, and L_s converted by the interface unit 20 and having the same format. The signal processing unit 30 may output the first-to-fourth detection data C_s, IC_s, R_s, and L_s included in the conversion data C_data provided from the interface unit 20 to the upper-level control device 200 as sensing data S_data in synchronization with a preset timing.

For example, the signal processing unit 30 may output the first-to-fourth detection data C_s, IC_s, R_s, and L_s as the sensing data S_data at the same timing on the basis of an input timing of one of the first-to-fourth detection data C_s, IC_s, R_s, and L_s.

In more detail, the signal processing unit 30 may receive and store the first-to-fourth detection data C_s, IC_s, R_s, and L_s, and may output the stored first-to-fourth detection data C_s, IC_s, R_s, and L_s as the sensing data S_data when a preset time has passed after the third detection data R_s was input to the signal processing unit 30. Here, the sensing data S_data may include the first-to-fourth detection data C_s, IC_s, R_s, and L_s obtained from the optical camera 11, the infrared camera 12, the radar 13, and the lidar 14.

Furthermore, the signal processing unit 30 may generate the contamination data PP_data on the basis of the external environment data EC_data and the conversion data C_data, and may provide the generated contamination data PP_data to the cleaning control device 300.

For example, the signal processing unit 30 may determine, on the basis of the conversion data C_data, whether an outer cover surface corresponding to locations of the optical camera 11, the infrared camera 12, the radar 13, and the lidar 14 is contaminated to generate the contamination data PP_data, and may control an output frequency of the generated contamination data PP_data on the basis of the external environment data EC_data.

In more detail, the signal processing unit 30 may output, as the contamination data PP_data, a determination result indicating that dirt or other foreign matter is adhering to the outer cover surface corresponding to a location of a corresponding sensor when a difference between a current data value and a previous data value of each of the first-to-fourth detection data C_s, IC_s, R_s, and L_s output from the optical camera 11, the infrared camera 12, the radar 13, and the lidar 14 exceeds a preset data value.

That is, the signal processing unit 30 may determine that dirt or other foreign matter is adhering to the outer cover surface of the automotive sensor integration module 100 when a data value of current detection data of each of the sensors 11 to 14 rapidly changes in comparison with previous detection data of each of the sensors 11 to 14.

For example, since the sensing period of the radar 13 and the lidar 14 is 30 Hz, a time difference between previous detection data and current detection data is 33 ms. If a distance to an object corresponding to previous detection data and current detection data output from the radar 13 or the lidar 14 is 10 meters, it may be determined that there is an object which is moving 30 meters per second. However, it is hard to consider such data as detection data generated in a normal situation. Thus, it may be desirable to determine that dirt or other foreign matter has adhered to the outer cover surface under which the radar 13 or the lidar 14 is located.

The signal processing unit 30 may determine whether an outer cover portion of the automotive sensor integration module 100 corresponding to each of the sensors 11 to 14 is contaminated as described above, and may control the output frequency of a contamination determination result (i.e., the contamination data PP_data) on the basis of the external environment data EC_data.

For example, the signal processing unit 30 may increase the output frequency of the contamination determination result in an environment in which dirt or other foreign matter may easily adhere to the outer cover of the automotive sensor integration module 100, and may decrease the output frequency of the contamination determination result in which dirt or other foreign matter may not easily adhere to the outer cover of the automotive sensor integration module 100.

In more detail, the signal processing unit 30 may output the contamination determination result more frequently when it rains, humidity is high, temperature is so low that frost is generated, or a vehicle is traveling on an unpaved road than when it does not rain, humidity is low, temperature is high, or a vehicle is traveling on a paved road.

For example, since dirt or other foreign matter easily adheres to the outer cover of the automotive sensor integration module 100 when it rains, humidity is high, or a vehicle is traveling on an unpaved road, and frost is easily generated in the automotive sensor integration module 100 when temperature is low, the signal processing unit 30 outputs the contamination data PP_data indicating the contamination determination result more frequently in such an environment than in an otherwise environment to clean the outer cover of the automotive sensor integration module 100, thereby improving reliability of the sensing data S_data output from the automotive sensor integration module 100.

Figure 7:
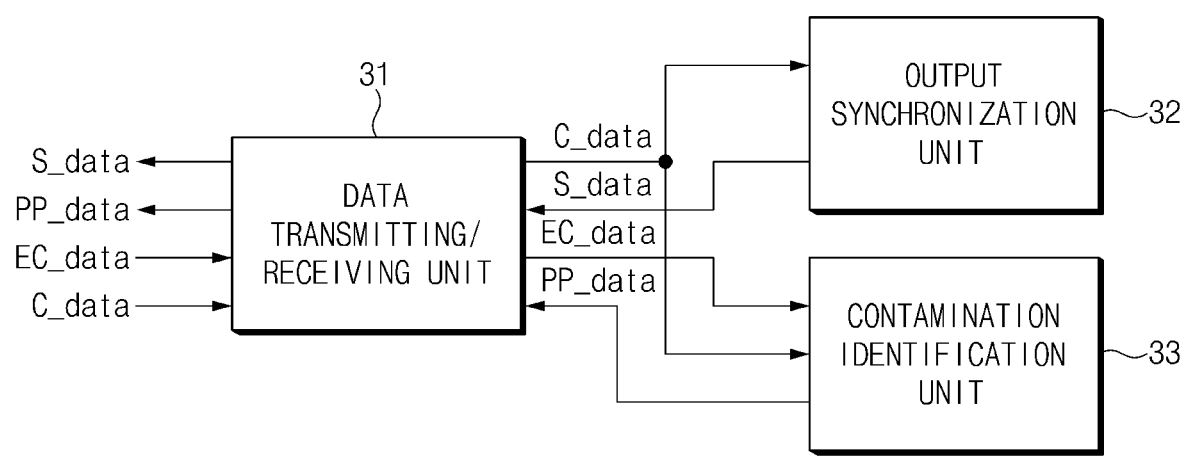
FIG. 7 is a diagram illustrating a configuration of the signal processing unit of FIG. 3.

FIG. 7 is a diagram illustrating a configuration of the signal processing unit of FIG. 3.

Referring to FIG. 7, the signal processing unit 30 may include a data transmitting/receiving unit 31, an output synchronization unit 32, and a contamination identification unit 33.

The data transmitting/receiving unit 31 may include a wired/wireless communication module for transmitting/receiving data to/from the interface unit 20, the upper-level control device 200, and the cleaning control device 300.

The data transmitting/receiving unit 31 may transmit, to the upper-level control device 200, the sensing data S_data received from the output synchronization unit 32. The data transmitting/receiving unit 31 may transmit, to the cleaning control device 300, the contamination data PP_data received from the contamination identification unit 33.

The data transmitting/receiving unit 31 may transmit, to the contamination identification unit 33, the external environment data EC_data received from the upper-level control device 200. The data transmitting/receiving unit 31 may transmit, to the output synchronization unit 32 and the contamination identification unit 33, the conversion data C_data received from the interface unit 20.

The output synchronization unit 32 may generate the sensing data S_data by synchronizing the conversion data C_data provided from the data transmitting/receiving unit 31, and may provide the generated sensing data to the data transmitting/receiving unit 31. For example, the output synchronization unit 32 may synchronize the first-to-fourth detection data C_s, IC_s, R_s, and L_s on the basis of any one of the first-to-fourth detection data C_s, IC_s, R_s, and L_s included in the conversion data C_data to provide the synchronized data to the data transmitting/receiving unit 31 as the sensing data S_data.

In more detail, the output synchronization unit 32 may store each of the first-to-fourth detection data C_s, IC_s, R_s, and L_s included in the conversion data C_data, and may output the stored first-to-fourth detection data C_s, IC_s, R_s, and L_s as the sensing data S_data when a preset time has passed after input of any one of the first-to-fourth detection data C_s, IC_s, R_s, and L_s.

The contamination identification unit 33 may generate the contamination data PP_data on the basis of the conversion data C_data and the external environment data EC_data provided from the data transmitting/receiving unit 31, and may provide the generated contamination data PP_data to the data transmitting/receiving unit 31. For example, the contamination identification unit 33 may generate the contamination data PP_data on the basis of the conversion data C_data, and may increase or decrease the output frequency of the contamination data PP_data on the basis of the external environment data EC_data.

Here, the conversion data C_data includes the first-to-fourth detection data C_s, IC_s, R_s, and L_s obtained from the optical camera 11, the infrared camera 12, the radar 13, and the lidar 14, and the contamination identification unit 33 generates the contamination data PP_data on the basis of each of the first-to-fourth detection data C_s, IC_s, R_s, and L_s, and thus, the contamination data PP_data may include information indicating whether an outer cover portion corresponding to the location of each sensor is contaminated.

Furthermore, since the external environment data EC_data includes weather, temperature, humidity, and road conditions, the contamination identification unit 33 may increase the output frequency of the contamination data PP_data so as to frequently clean the outer cover of the automotive sensor integration module 100 in an environment in which dirt or other foreign matter may easily adhere to the outer cover of the automotive sensor integration module 100.

Figure 8:
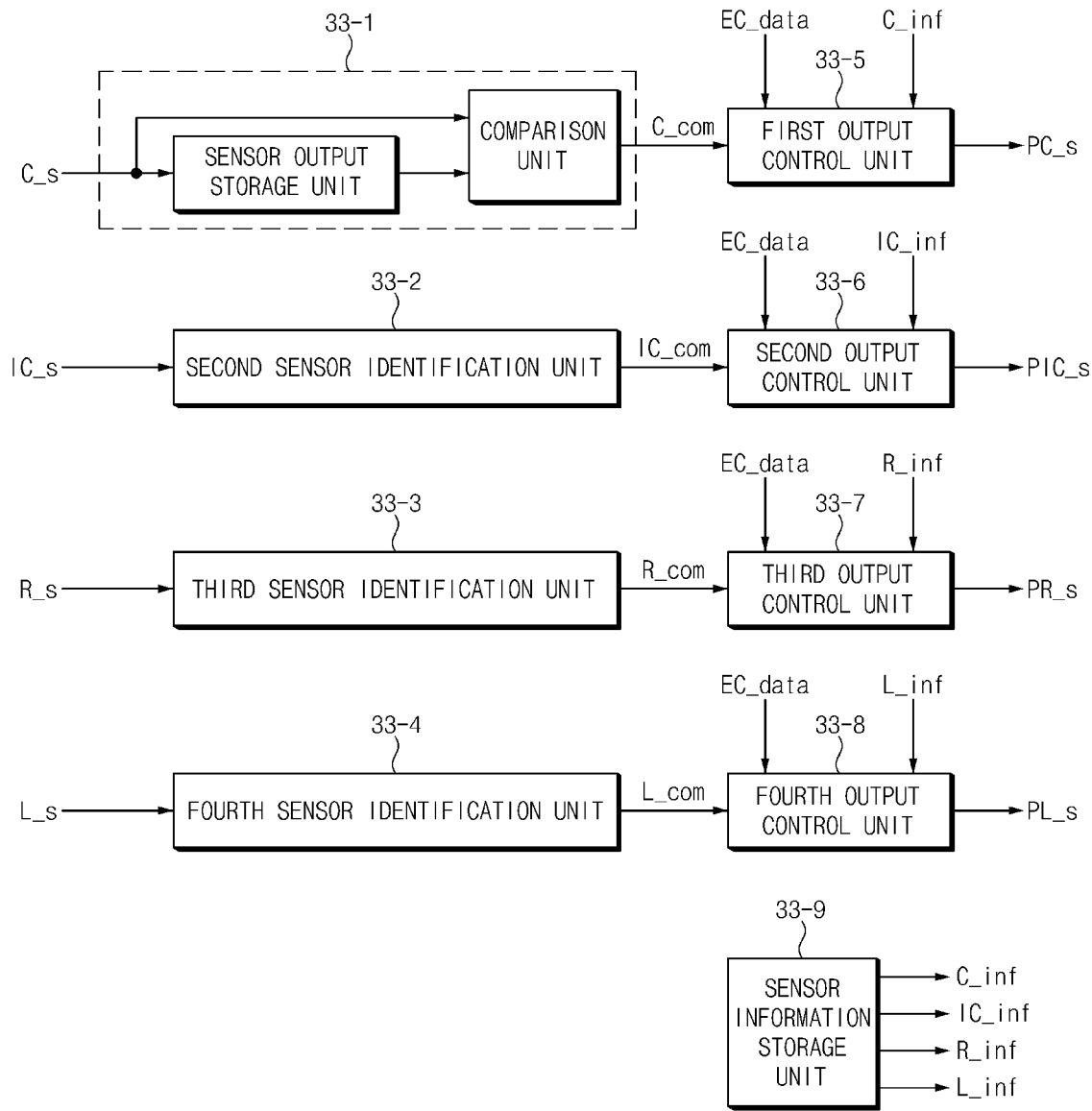
FIG. 8 is a diagram illustrating a configuration of the contamination identification unit of FIG. 7.

FIG. 8 is a diagram illustrating a configuration of the contamination identification unit of FIG. 7.

As illustrated in FIG. 8, the contamination identification unit 33 may include first-to-fourth sensor identification units 33-1 to 33-4 and first-to-fourth output control units 33-5 to 33-8. Here, the contamination identification unit 33 may further include a sensor information storage unit 33-9.

As described above, the contamination identification unit 33 may determine whether the outer cover of the automotive sensor integration module 100 is contaminated by comparing previous data and current data of each of the first-to-fourth detection data C_s, IC_s, R_s, and L_s included in the conversion data C_data.

The first sensor identification unit 33-1 may generate a first comparison signal C_com by comparing previous data and current data of the first detection data C_s. For example, the first sensor identification unit 33-1 may generate the first comparison signal C_com having a first level when a data value difference between previous data and current data of the first detection data C_s exceeds a preset data value. The first sensor identification unit 33-1 may generate the first comparison signal C_com having a second level when the data value difference between previous data and current data of the first detection data C_s is less than the preset data value.

The second sensor identification unit 33-2 may generate a second comparison signal IC_com by comparing previous data and current data of the second detection data IC_s. For example, the second sensor identification unit 33-2 may generate the second comparison signal IC_com having a first level when the data value difference between previous data and current data of the second detection data IC_s exceeds the preset data value. The second sensor identification unit 33-2 may generate the second comparison signal IC_com having a second level when the data value difference between previous data and current data of the second detection data IC_s is less than the preset data value.

The third sensor identification unit 33-3 may generate a third comparison signal R_com by comparing previous data and current data of the third detection data R_s. For example, the third sensor identification unit 33-3 may generate the third comparison signal R_com having a first level when the data value difference between previous data and current data of the third detection data R_s exceeds the preset data value. The third sensor identification unit 33-3 may generate the third comparison signal R_com having a second level when the data value difference between previous data and current data of the third detection data R_s is less than the preset data value.

The fourth sensor identification unit 33-4 may generate a fourth comparison signal L_com by comparing previous data and current data of the fourth detection data L_s. For example, the fourth sensor identification unit 33-4 may generate the fourth comparison signal L_com having a first level when the data value difference between previous data and current data of the fourth detection data L_s exceeds the preset data value. The fourth sensor identification unit 33-4 may generate the fourth comparison signal L_com having a second level when the data value difference between previous data and current data of the fourth detection data L_s is less than the preset data value.

Here, the first level of each of the first-to-fourth comparison signals C_com, IC_com, R_com, and L_com may indicate adherence of dirt or other foreign matter to an outer cover portion corresponding to the location of each corresponding sensor. The second level of each of the first-to-fourth comparison signals C_com, IC_com, R_com, and L_com may indicate that there is no dirt or other foreign matter adhering to an outer cover portion corresponding to the location of each corresponding sensor. The first level and the second level are different levels, and may be analog levels or may be levels according to at least one digital signal.

As described above, the first-to-fourth sensor identification units 33-1 to 33-4 may only differ in terms of input/output signal reference names and may perform the same operation. Thus, the first-to-fourth sensor identification units 33-1 to 33-4 may have the same configuration. Therefore, the following description of the configuration of the first sensor identification unit 33-1 among the first-to-fourth sensor identification units 33-1 to 33-4 applies to the second to fourth identification units 33-2 to 33-4.

The first sensor identification unit 33-1 may include a sensor output storage unit 33-1-1 and a comparison unit 33-1-2.

The sensor output storage unit 33-1-1 may receive and store the first detection data C_s, and may output the stored first detection data when the next first detection data C_s is input. For example, the sensor output storage unit 33-1-1 may be implemented as a shift register, and may output stored previous data when current data is input.

The comparison unit 33-1-2 may receive an output from the sensor output storage unit 33-1-1 and the first detection data C_s to compare data values thereof, and may output a comparison result as the first comparison signal C_com. For example, the comparison unit 33-1-2 may output the first comparison signal C_com having a first level when a data value difference between the output (previous first detection data) from the sensor output storage unit 33-1-1 and the first detection data C_s (current first detection data) exceeds a preset data value.

The comparison unit 33-1-2 may output the first comparison signal C_com having a second level when the data value difference between the output (previous first detection data) from the sensor output storage unit 33-1-1 and the first detection data C_s (current first detection data) is less than the preset data value.

The first output control unit 33-5 may receive the first comparison signal C_com and the external environment data EC_data, and may output the contamination data PP_data including information PC_s indicating whether the optical camera 11 is contaminated.

For example, the first output control unit 33-5 may output the first comparison signal C_com as the information PC_s indicating whether the optical camera 11 is contaminated, i.e., the contamination data PP_data. Here, the first output control unit 33-5 may increase or decrease, on the basis of the external environment data EC_data, the output frequency of the contamination data PP_data (PC_s) including information indicating whether the optical camera 11 is contaminated.

Furthermore, the first output control unit 33-5 may further receive camera information C_inf. The camera information C_inf may include the location of the optical camera 11 arranged in the automotive sensor integration module 100. Not only the external environment data EC_data but also the camera information C_inf may increase or decrease the output frequency of the contamination data PP_data (PC_s).

The second output control unit 33-6 may receive the second comparison signal C_com and the external environment data EC_data, and may output the contamination data PP_data (PIC_s) including information PIC_s indicating whether the infrared camera 12 is contaminated.

For example, the second output control unit 33-6 may output the second comparison signal IC corn as the information PIC_s indicating whether the infrared camera 12 is contaminated, i.e., the contamination data PP_data. Here, the second output control unit 33-6 may increase or decrease, on the basis of the external environment data EC_data, the output frequency of the contamination data PP_data (PIC_s) including information indicating whether the infrared camera 12 is contaminated.

Furthermore, the second output control unit 33-6 may further receive infrared camera information IC_inf. The infrared camera information IC_inf may include the location of the infrared camera 12 arranged in the automotive sensor integration module 100. Not only the external environment data EC_data but also the infrared camera information IC_inf may increase or decrease the output frequency of the contamination data PP_data (PIC_s).

The third output control unit 33-7 may receive the third comparison signal R_com and the external environment data EC_data, and may output the contamination data PP_data (PR_s) including information PR_s indicating whether the radar 13 is contaminated.

For example, the third output control unit 33-7 may output the third comparison signal R_com as the information PR_s indicating whether the radar 13 is contaminated, i.e., the contamination data PP_data. Here, the third output control unit 33-7 may increase or decrease, on the basis of the external environment data EC_data, the output frequency of the contamination data PP_data (PR_s) including information indicating whether the radar 13 is contaminated.

Furthermore, the third output control unit 33-7 may further receive radar information R_inf. The radar information R_inf may include the location of the radar 13 arranged in the automotive sensor integration module 100. Not only the external environment data EC_data but also the radar information R_inf may increase or decrease the output frequency of the contamination data PP_data (PR_s).

The fourth output control unit 33-8 may receive the fourth comparison signal L_com and the external environment data EC_data, and may output the contamination data PP_data (PL_s) including information PL_s indicating whether the lidar 14 is contaminated.

For example, the fourth output control unit 33-8 may output the fourth comparison signal L_com as the information PL_s indicating whether the lidar 14 is contaminated, i.e., the contamination data PP_data. Here, the fourth output control unit 33-8 may increase or decrease, on the basis of the external environment data EC_data, the output frequency of the contamination data PP_data (PL_s) including information indicating whether the lidar 14 is contaminated.

Furthermore, the fourth output control unit 33-8 may further receive lidar information L_inf. The lidar information L_inf may include the location of the lidar 14 arranged in the automotive sensor integration module 100. Not only the external environment data EC_data but also the lidar information L_inf may increase or decrease the output frequency of the contamination data PP_data (PL_s).

The sensor information storage unit 33-9 may store arrangement locations of the optical camera 11, the infrared camera 12, the radar 13, and the lidar 14 in the automotive sensor integration module 100.

Furthermore, the sensor information storage unit 33-9 may store a cleaning strength for the outer cover of the automotive sensor integration module 100 according to each arrangement location of the optical camera 11, the infrared camera 12, the radar 13, and the lidar 14. The cleaning strengths for sensors arranged in a lower portion of the automotive sensor integration module 100 may be higher than the cleaning strengths for sensors arranged in an upper portion of the automotive sensor integration module 100. Here, when outputting the contamination data PP_data (PC_s, PIC_s, PR_s, PL_s), each of the first-to-fourth output control units 33-5 to 33-8 may add, to the contamination data PP_data (PC_s, PIC_s, PR_s, PL_s), the cleaning strength according to arrangement of each of the sensors.

In brief, each of the first-to-fourth output control units 33-5 to 33-8 may output each of the first-to-fourth comparison signals C_com, IC_com, R_com, and L_com as the contamination data PP_data (PC_s, PIC_s, PR_s, PL_s). Here, the first-to-fourth output control units 33-5 to 33-8 may increase or decrease the output frequency of each of the contamination data PC_s, PIC_s, PR_s, and PL_s according to the external environment data EC_data.

As described above, the external environment data EC_data may include information about at least one of weather, road condition, temperature, or humidity.

When the weather, the road condition under which a vehicle is traveling, the temperature, or the humidity is determined to allow dirt or other foreign matter to easily adhere to the outer cover of the automotive sensor integration module 100, the first-to-fourth output control units 33-5 to 33-8 may increase the output frequency of the contamination data PP_data (PC_s, PIC_s, PR_s, PL_s). On the contrary, when the weather, the road condition under which a vehicle is traveling, the temperature, or the humidity is determined not to allow dirt or other foreign matter to easily adhere to the outer cover of the automotive sensor integration module 100, the first-to-fourth output control units 33-5 to 33-8 may decrease the output frequency of the contamination data PP_data (PC_s, PIC_s, PR_s, PL_s).

In addition, each of the first-to-fourth output control units 33-5 to 33-8 may increase or decrease the frequency of each of the contamination data PP_data (PC_s, PIC_s, PR_s, PL_s) according to the location of each of the optical camera 11, the infrared camera 12, the radar 13, and the lidar 14 arranged in the automotive sensor integration module 100.

For example, in the case where the optical camera 11 and the infrared camera 12 are arranged at higher positions than the radar 13 and the lidar 14, the output frequency of the contamination data PP_data (PC_s, PIC_s) output from the first and second output control units 33-5 and 33-6 may be lower than the output frequency of the contamination data PP_data (PR_s, PL_s) output from the third and fourth output control units 33-6 and 33-7.

As described above, the automotive sensor integration module 100 according to the present invention may determine whether each of outer cover regions corresponding to the locations of the optical camera 11, the infrared camera 12, the radar 13, and the lidar 14 included in the automotive sensor integration module 100 is contaminated, and may provide a determination result to the cleaning control device 300, and thus the reliability of determination of an object positioned outside a vehicle may be improved.

Furthermore, the automotive sensor integration module 100 according to the present invention may increase or decrease the output frequency of contamination data related to whether each of the outer cover regions is contaminated according to an external environment and the arrangement locations of the optical camera 11, the infrared camera 12, the radar 13, and the lidar 14, and thus the reliability of determination of an object positioned outside a vehicle may be further improved.

The automotive sensor integration module according to an exemplary embodiment of the present invention has improved performance of detecting objects outside a vehicle since a plurality of sensors are synchronously operated.

Furthermore, the automotive sensor integration module according to an exemplary embodiment of the present invention has improved performance of detecting objects outside a vehicle since a plurality of sensors can be cleaned individually by determining whether each of the sensors is contaminated.

Although the present invention has been described with reference to the drawings exemplified as above, the present invention is not limited to the embodiments and drawings disclosed herein, and it would be obvious that various modifications may be made by those skilled in the art within the scope of the technical spirit of the present invention. Furthermore, it is apparent that, although the effects brought about by the configuration of the present invention are not clearly mentioned while describing the embodiments of the present invention, any effect, which can be predicted from the configuration, can also be acknowledged.

What is claimed is:

1. An automotive sensor integration module comprising:
a circuit board;
a plurality of sensors that are provided on the circuit board and differing from each other in at least one of a sensing period or an output data format;
an outer cover coupled to a front surface of the automotive sensor integration module and covering the circuit board and the plurality of sensors;
a signal processor configured to determine whether each region of the outer cover corresponding to a location of each of the plurality of sensors is contaminated on the basis of pieces of detection data outputted from each of the plurality of sensors; and
a cleaning device configured to eject water toward a region of the outer cover that is contaminated on the basis of the determination,
wherein the signal processor increases or decreases a determination frequency for determining whether each region of the outer cover is contaminated on the basis of external environment data.

2. The automotive sensor integration module of claim 1, wherein the cleaning device comprises:
a body; and
a sprayer that is moved towards or away from the body, and including a liquid spray nozzle configured to eject the water such that a position of the liquid spray nozzle is varied according to a position of the sprayer.

3. The automotive sensor integration module of claim 1, wherein the signal processor receives and stores the pieces of detection data, and simultaneously outputs the stored pieces of detection data to an upper-level control device that is configured to control driving of a vehicle, on the basis of the sensing period of any one of the plurality of sensors.

4. The automotive sensor integration module of claim 1, wherein the signal processor compares data values of current data and previous data of each of the pieces of detection data and determines whether each region of the outer cover corresponding to the location of each of the plurality of sensors is contaminated on the basis of the comparison.

5. The automotive sensor integration module of claim 4, wherein:
the signal processor comprises an output synchronization unit and a contamination identification unit;
the output synchronization unit is configured to receive and store the pieces of detection data, and output the stored pieces of detection data to the contamination identification unit on the basis of any one of the pieces of detection data; and
the contamination identification unit is configured to receive and store the pieces of detection data, compare data values of the pieces of detection data output from the plurality of sensors with the stored pieces of detection data, and determine whether each region of the outer cover corresponding to the location of each of the plurality of sensors is contaminated on the basis of the comparison.

6. The automotive sensor integration module of claim 1, wherein the signal processor increases, according to the external environment data, the determination frequency in an environment in which dirt or other foreign matter easily adheres to the outer cover in comparison with an environment in which it is difficult for the dirt or other foreign matter to adhere to the outer cover.

7. The automotive sensor integration module of claim 6, wherein:
the external environment data comprises data related to weather, a road condition, a temperature, and a humidity; and
the signal processor increases, according to the external environment data, the determination frequency in a case in which it rains, a vehicle is traveling on an unpaved road, the temperature is low, or the humidity is high in comparison with a case in which it does not rain, the vehicle is traveling on a paved road, the temperature is high, or the humidity is low.

8. An automotive sensor integration module comprising:
a circuit board;
a plurality of sensors that are provided on the circuit board and differing from each other in at least one of a sensing period or an output data format;
an outer cover coupled to a front surface of the automotive sensor integration module and covering the circuit board and the plurality of sensors;
a signal processor configured to determine whether each region of the outer cover corresponding to a location of each of the plurality of sensors is contaminated on the basis of pieces of detection data outputted from each of the plurality of sensors; and
a cleaning device configured to eject water toward a region of the outer cover that is contaminated on the basis of the determination,
wherein the signal processor increases or decreases a determination frequency for determining whether each region of the outer cover is contaminated on the basis of an arrangement location of each of the plurality of sensors.

9. The automotive sensor integration module of claim 8, wherein the signal processor increases the determination frequency for sensors arranged at a lower position among the plurality of sensors in comparison with sensors arranged at a higher position.

10. The automotive sensor integration module of claim 9, wherein the signal processor comprises:
a plurality of sensor output storage units configured to receive and store each of the pieces of detection data output from the plurality of sensors;
a plurality of comparison units configured to compare the pieces of detection data output from the plurality of sensors with the stored pieces of detection data output from the plurality of sensor output storage units; and
a plurality of output control units configured to output, as the contamination data, outputs from the plurality of comparison units, and increase or decrease the output frequency of the contamination data according to the external environment data and the arrangement location of each of the plurality of sensors.

11. The automotive sensor integration module of claim 9, wherein the plurality of sensors include at least two of an infrared camera, an optical camera, a lidar, or a radar.

\* \* \* \* \*